Patented Jan. 11, 1944

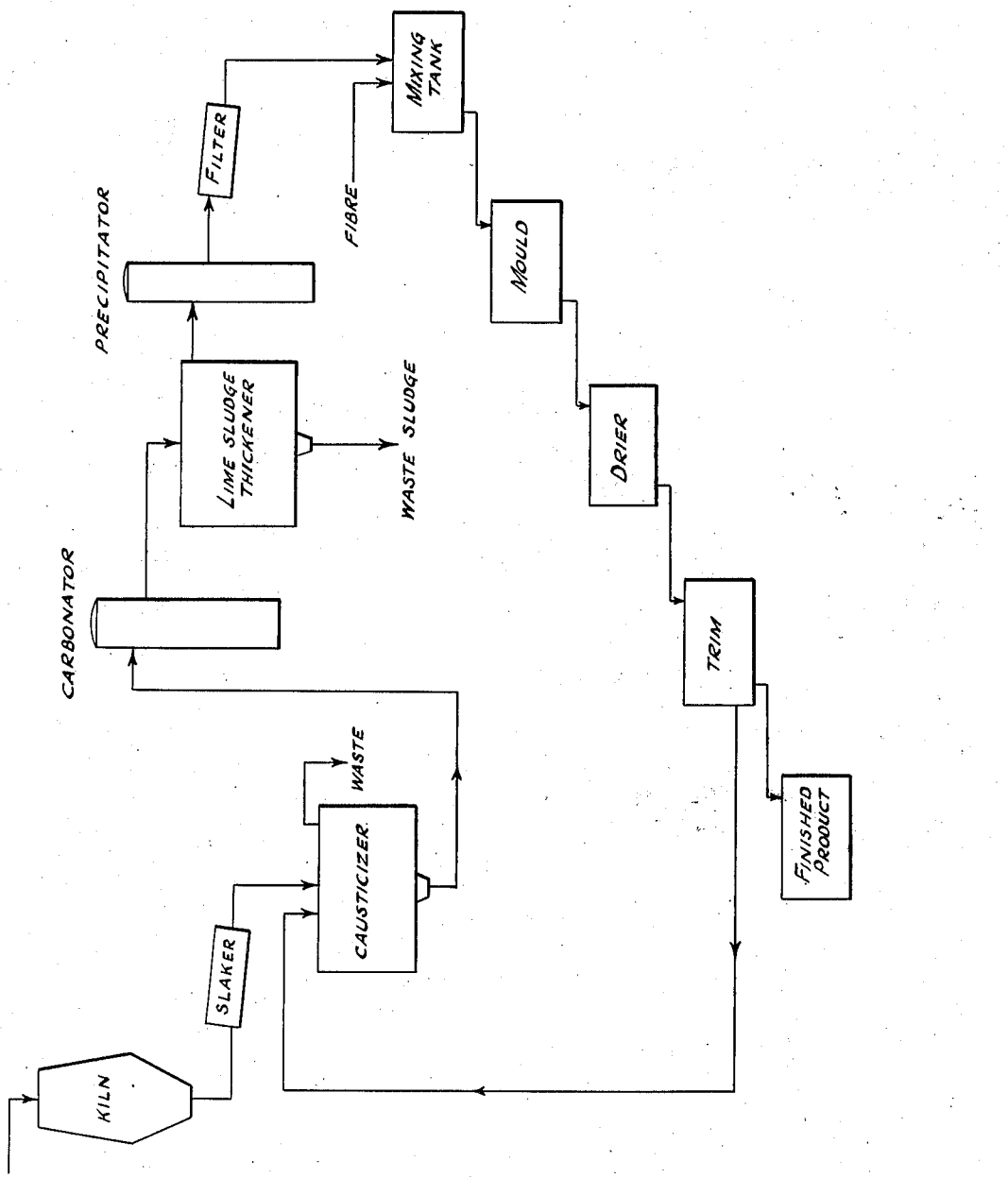

2,338,886

UNITED STATES PATENT OFFICE 2,338,886

CAUSTICIZING OF WASTE MAGNESIA PRODUCTS

Hermann F. Vieweg, Fort Sill, Okla., Arthur B. Cummins, Millington, N. J., and Thomas C. Pond, Larchmont, N. Y., assignors to Johns-Manville Corporation, New York, N. Y., a corporation of New York Application August 13, 1941, Serial No. 406,584

4 Claims. (Cl. 23—67)

This invention relates to basic magnesium carbonate compositions of the type suitable for insulating purposes in the form of pipe coverings, blocks or the like, and particularly to magnesia products containing reclaimed magnesium components obtained from waste magnesia materials. The invention pertains especially to the novel procedure of treating waste magnesia materials in order to make the water-insoluble basic magnesium carbonates more susceptible to passing into solution upon treatment with a carbonating gas.

Heat insulating materials containing basic magnesium carbonate are conventionally made by forming an admixture of basic magnesium carbonate and a fibrous component such as asbestos fibres. The thus formed mixture is placed into molds designed in conformity with the shape desired in the final product and thereafter the molded product is subjected to a drying action. The resulting product contains about 85% basic magnesium carbonate and approximately 15% fibrous components. This product is generally referred to in commerce as 85% magnesia.

In order to shape the crude molded products of such basic magnesium carbonate compositions to accurate and proper sizes, it is necessary to subject in many cases these molded forms to sizing or finishing operations. As a result of the sizing or finishing operations a considerable quantity of the basic magnesium carbonate composition is lost in the form of trimmings. These trimmings are usually in the form of dust and small lumps. It has been estimated that approximately 20–60% of the weight of the finished products are accumulated as trimmings and waste material and the necessity of utilizing such large quantities of waste materials, including valuble magnesium compounds, in an economical manner will be readily apparent.

Another source of waste basic magnesium carbonate compositions, which may be utilized in the present invention, is made available in cases where existing insulated structures such as pipe lines and boilers are stripped of old magnesia insulating materials. Materials thus obtained have been previously discarded as waste, but through the application of the procedure described in more detail below the magnesia components of these waste materials can readily be recovered and used in manufacturing new insulating materials.

Efforts to reclaim waste basic magnesium carbonate compositions, in which we include dust, trimmings, broken blocks, broken pipe coverings and any other sources of waste products containing magnesia components, have previously been made. In the previous operations, waste magnesia materials have been crushed and then added to fresh stock material but in following these procedures accumulated dirt and other undesirable fines were added and thus tended to increase the weight of the final magnesia product. In another method designed to reclaim the insoluble basic magnesium carbonate materials, it has been proposed to convert the insoluble basic magnesium components into a soluble form of such compound by introducing carbon dioxide gas under high pressure and high concentration in an aqueous suspension of such waste materials. This method has, however, been found to be not entirely satisfactory and impractical due to the necessary high pressures and high concentrations of the carbon dioxide and the very limited conversion of the basic magnesium carbonate into the soluble magnesium bicarbonate.

Accordingly, it is an object of this invention to convert the insoluble basic magnesium carbonate contained in waste insulating materials into a magnesium compound which is more readily converted into the water-soluble magnesium compound without necessarily using high pressures and high concentrations of carbon dioxide gas. It is also an object of this invention to treat waste magnesium compounds to convert the compounds into more readily water-soluble compounds which will permit the use of higher temperatures in the carbonation step when cooling is not possible. Other objects and benefits of the present invention will be apparent to those skilled in the art from the more detailed description of the novel method described below.

Broadly stated, the invention includes treating waste basic magnesium carbonate materials with a water soluble hydroxide, such as calcium hydroxide, sodium hydroxide or the like, to convert the magnesium compounds into magnesium hydroxide compounds which are readily converted into magnesium bicarbonate solutions. The treatment of the basic magnesium carbonate with the water soluble hydroxide may ordinarily be referred to as causticizing. After the basic magnesium compounds have been properly causticized, subsequent treatment with carbon dioxide gas at relatively low concentrations and pressure will readily convert the insoluble magnesium hydroxide into water soluble magnesium bicarbonate compounds. Upon heating the magnesium bicarbonate solution, the magnesium compounds will precipitate as a self-setting normal carbonate or a basic magnesium carbonate, depending upon the temperature and the length of time the solution is subjected to the heating operation. It will thus be clear that the reclaimed waste basic magnesium carbonate materials may be utilized in preparing either self-setting normal magnesium carbonates or the conventional basic magnesium carbonates depending entirely upon the characteristics desired in the reclaimed magnesium compounds.

The invention will be illustrated by a more complete description in connection with the attached drawing which shows a flow sheet of the method of manufacturing basic magnesium carbonate insulating materials in conjunction with the preferred embodiment of the novel method employed in the procedure of reclaiming waste basic magnesium carbonate compositions.

In the drawing dolomite mineral preferably mixed with coke, is fed to a kiln and subjected to a calcination treatment. In the calcining operation the dolomite material is decomposed and carbon dioxide gas is driven from the calcium carbonate and the magnesium carbonate found in the dolomite mineral. The carbon dioxide gas obtained from the calcining operation may conveniently be used in the carbonator in a subsequent step of the operation.

The calcined dolomite now containing primarily the mixture of calcium oxide and magnesium oxide is then passed into a slaking machine. In the slaking operation water is mixed with the mixed oxides in order to begin the conversion of the oxides into the respective hydroxides, viz., calcium hydroxide and magnesium hydroxide. After the materials have been thoroughly wetted, a more complete hydration of the materials is made in the causticizer.

The causticizer is conveniently a relatively large tank in which the materials are contacted by a large volume of water. It has been found that if the mixture is constantly agitated, more complete reaction of the materials will be obtained. The calcium and magnesium components are now in the form of substantially water-insoluble precipitates, that is, calcium hydroxide and magnesium hydroxide.

The mixed calcium and magnesium hydroxides are now pumped to a series of carbonating units. In the carbonator carbon dioxide gas is passed through the relatively thin slurry and the gas will react chemically with the suspended calcium and magnesium hydroxides. The calcium hydroxide will be converted into substantially water-insoluble calcium carbonate and the magnesium hydroxide will be converted into the water-soluble magnesium bicarbonate compound. The concentration of the carbon dioxide gas can be relatively low, that is, the gas passing through the slurry may contain about 33% of carbon dioxide. Also, the pressure can be kept relatively low, that is, approximately 45 lbs. per square inch gauge or lower.

After the mixture has been sufficiently carbonated, the magnesium bicarbonate solution including the precipitated calcium carbonate is pumped into a thickening tank. In the thickening tank the calcium carbonate is allowed to settle to the bottom of the container and the substantially clear magnesium bicarbonate solution is then pumped into a precipitator. The settled calcium carbonate material frequently referred to as waste or lime sludge is removed from the thickener. This sludge contains a considerable quantity of precipitated magnesium carbonate and also a considerable proportion of magnesium bicarbonate solution retained or absorbed by the sludge particles. These magnesium compounds are recovered by a method which is more fully described and claimed in the copending application of Thomas F. Atchison, Serial No. 406,577.

The substantially clear magnesium bicarbonate solution is then subjected to a heating action in the precipitator. During the heating operation carbon dioxide gas is driven from the magnesium bicarbonate solution and the gas thus obtained may also be salvaged by using it in the carbonation operation in the saturator. The precipitated magnesium compounds are now passed to a filter or other dewatering device where a substantial quantity of water is removed from the precipitated materials.

Thereafter, the precipitated magnesium compounds are mixed with fibrous compounds such as asbestos fibres in a conventional mixing tank. Usually fibres in the amount of about 15% by weight are mixed with the precipitated materials and after a thorough mixing the mixture is transferred into molds in the form of blocks, pipe covering, or any other shape which might be desired in the final product. After the molded materials have been formed, the materials are subjected to a drying operation to remove substantially all the water from the material.

The shaped and dried basic magnesium carbonate materials obtained as described above, are now subjected to a trimming operation. The trimming operation is essential in order to shape and cut the molded magnesia product to the proper dimensions. These trimmings are oftentimes referred to in the industry as "plastic," and a proportion of these trimmings have heretofore been re-used in the operations by merely grinding the trim to a relatively small mesh and then mixing the pulverulent material with fresh ingredients.

The accumulated trim in the present operation is preferably ground to a particle size of about 20–60 mesh and then placed into the causticizer for further treatment. Care should be taken in the grinding operation that the asbestos fibres contained in the trim are not broken into too small fibre lengths. In this operation it may be desirable to crush the trimmed materials to relatively large particles and then pass the trim over ordinary separating screens to remove the asbestos fibres from the crushed trim before passing the material into the causticizer.

The magnesium compounds in the plastic trim are substantially in the form of basic magnesium carbonate. Similarly, the magnesium compounds in waste magnesia products referred to above, are also in the form of basic magnesium carbonate.

In the causticizer the basic magnesium carbonate will react with calcium hydroxide usually derived from the calcined hydrated dolomite to form a substantially water-insoluble magnesium hydroxide. If, however, dolomite materials are not used as raw materials in the magnesia product manufacturing process, lime or caustic soda may be added to the basic magnesium carbonate in order to obtain the necessary causticizing reaction. The lime will react with the basic magnesium carbonate to form a substantially water-insoluble magnesium hydroxide. The reaction proceeds forward in the same manner as the reaction between the basic magnesium carbonate and the calcined dolomite.

It is well recognized that basic magnesium carbonate will react relatively slowly with carbon dioxide gas in the conversion of the basic magnesium carbonate into the water-soluble magnesium bicarbonate. If, however, the basic magnesium carbonate is treated with an alkaline earth hydroxide, such as calcium hydroxide, as described above, prior to the carbonation step, the thus-formed magnesium hydroxide is more readily convertible into the water-soluble magnesium bicarbonate. The solubility of the two compounds will be illustrated by consideration of the following experimental data on the carbonation of trim materials:

SOLUBILITY OF BASIC MAGNESIUM CARBONATE ("PLASTIC" TRIM FROM MAGNESIA INSULATIONS) BY CARBON DIOXIDE (7 LB. GAUGE PRESSURE $CO_2$)

Table I

| Temperature, °F. | Concentration of magnesia in solution as the bicarbonate (expressed as equivalent of basic magnesium carbonate) |
|---|---|
| | Per cent |
| 70 | 1.79 |
| 85 | 1.37 |
| 100 | 0.95 |

SOLUBILITY OF MAGNESIUM HYDRATE (FROM SLAKED DOLOMITE) IN CARBON DIOXIDE (7 LB. GAUGE PRESSURE $CO_2$)

Table II

| Temperature, °F. | Concentration of magnesia in solution as the bicarbonate (expressed as equivalent of basic magnesium carbonate) |
|---|---|
| | Per cent |
| 70 | 2.56 |
| 85 | 2.06 |
| 100 | 1.79 |

It will be evident from the data that a considerably higher proportion of magnesium compounds will pass into solution in the form of magnesium bicarbonate by converting the basic magnesium carbonate into the magnesium hydrate before treating with carbon dioxide gas.

The effect of treating waste basic magnesium carbonate materials with a causticizing material is also illustrated by consideration of the following additional data which shows the high recovery of the magnesium components as a result of the novel treatment:

CARBONATION OF "PLASTIC" BY CAUSTICIZING METHOD (ADDITION OF PLASTIC MAGNESIUM CARBONATE TRIM TO HYDRATE CALCINED DOLOMITE PRIOR TO SATURATION)

Table III

[Temperature 100° F., 7 lb. gauge pressure $CO_2$]

Concentration of magnesia in solution as the bicarbonate (expressed as equivalent of basic-magnesium carbonate)
Dolomite used ............................................. 1.08%
Plastic used ................................................. 0.67%
Total available ............................................ 1.75%
Causticizing time ......................................... 2 hrs. 20 min.

| Time of carbonation | Concentration |
|---|---|
| | Per cent |
| 0 min | 0.03 |
| 15 min | 1.17 |
| 30 min | 1.64 |
| 45 min | 1.67 |
| 60 min | 1.73 |

The data compiled in Table III shows that when a mixture, the total magnesia of which comes 38.3% from waste basic magnesium carbonate materials and 61.7% from calcined hydrated dolomite, is carbonated after approximately 2 hours of causticizing treatment, that practically all the magnesium compounds from both sources are taken into solution. The data further shows that the ultimate concentrations of magnesium bircarbonate corresponding to 1.73% basic magnesium carbonate as compared to only .95% of magnesium being taken into solution from ordinary uncausticized basic magnesium carbonate. The conditions of temperature and carbon dioxide pressure were the same in each case, Table I showing the concentration of magnesia in solution in the form of a bicarbonate expressed as equivalent of basic magnesium carbonate and Table III shows the concentration of magnesia taken into solution as the bicarbonate expressed as equivalent of basic magnesium carbonate after causticization treatment.

It is important that the waste basic magnesium compounds be subjected to sufficient causticizing action in order to obtain the desired and efficient results. If the magnesium compounds are incompletely causticized, the recovery of the magnesium compounds will be incomplete. This is evidenced by consideration of the data in the following tables:

Table IV

[Carbonation of mixes containing 40% plastic-60% dolomite using 7 lbs. gauge $CO_2$]

| | (a) | (b) |
|---|---|---|
| Dolomite used | 1.05% | 1.20%. |
| Plastic used | 0.70% | 0.80%. |
| Total Mg available | 1.75% | 2.00%. |
| Causticization time | 15 min | 1½ hr. |

| Time of carbonation | Concentration | Concentration |
|---|---|---|
| 15 min ............................ per cent | 0.90 | 1.20 |
| 30 min .................................... do | 1.42 | 1.89 |
| 45 min .................................... do | 1.47 | 2.00 |
| 60 min .................................... do | 1.49 | 2.00 |
| 75 min .................................... do | 1.50 | 2.00 |
| Final temperature ................. °F | 79 | 75 |

Further data on the time of causticizing using 25 lb. gauge pressure $CO_2$ are set forth in Table V.

Table V

[Effect of causticizing time—25 lbs. $CO_2$]

| | (a) | (b) | (c) | (d) |
|---|---|---|---|---|
| Dolomite used | 1.05% | 1.05% | 1.05% | 1.05%. |
| Plastic used | 0.70% | 0.70% | 0.70% | 0.70%. |
| Total available | 1.75% | 1.75% | 1.75% | 1.75%. |
| Causticizing time | 10 min | 40 min | 1 hr | 65 hrs. |

| Time of carbonation | Concentration | Concentration | Concentration | Concentration |
|---|---|---|---|---|
| 15 min | 1.14 | 1.47 | 1.62 | 1.69 |
| 30 min | 1.27 | 1.64 | 1.75 | 1.74 |
| 45 min | 1.32 | 1.64 | 1.75 | 1.75 |
| 60 min | 1.33 | 1.62 | | |
| 75 min | 1.32 | 1.64 | | |
| Final temp. °F | 80 | 85 | 85 | 75 |

Tables IV and V definitely show that the length of time to which the materials are subjected to the causticizing treatment should be sufficiently long so that the conversion from the basic magnesium carbonate to the water-insoluble magnesium hydroxide will be substantially complete. A period of time approximately 45 mins. to 1 hour is considered adequate to permit substantially complete conversion of the basic magnesium carbonate in a mixture containing 40% waste basic magnesium carbonate materials and 60% calcined hydrated dolomite for satisfactory carbonation of the materials in order to obtain complete recovery in the form of magnesium bicarbonate. If the percentage of waste basic magnesium carbonate compound is increased, as, for example, 55% of waste basic magnesium carbonate materials and 45% of calcined hydrated dolomite, it may be necessary to increase the causticizing time. If the pressure of the carbon dioxide gas is increased from 7 pounds gauge pressure, Table IV, to 25 pounds gauge pressure, Table V, the time required for the causticizing treatment may be decreased.

In following the procedure described, waste basic magnesium carbonate materials are effectively recovered and utilized in new magnesia products. The causticizing treatment prior to the carbonation of the waste magnesia products enables effective and substantially complete recovery of the valuable magnesia compounds without using expensive high pressure carbonating equipment. Furthermore, a shorter period of time is required during the carbonation procedure in order to obtain satisfactory and effective recovery of the magnesia compounds.

Having thus described our invention in rather full detail, it will be understood that these details need not be strictly adhered to, but that various changes and modifications will suggest themselves to one skilled in the art, all falling within the scope of the invention as defined by the subjoined claims.

We claim:

1. A cyclic process of manufacturing shaped magnesia insulation products which comprises, calcining dolomite and hydrating the calcined dolomite to produce a dilute, aqueous suspension of calcium and magnesium hydoxides, carbonating said suspension to form a solution of magnesium bicarbonate and precipitated insoluble calcium carbonate, separating the precipitate and heating the bicarbonate solution to precipitate basic magnesium carbonate, molding the basic carbonate and drying and trimming the molded shapes to dimensions, causticizing the waste material produced by said trimming operation by adding it to said suspension of calcium and magnesium hydroxides, and agitating the mixture to convert the magnesia trimmings to magnesium hydroxide.

2. That improvement on the process of manufacturing shaped magnesia insulation products, wherein magnesium bicarbonate solution is converted to basic magnesium carbonate, which, in mixture with asbestos fibres, is molded and the molded mixture dried and trimmed to dimensions, which comprises, forming a dilute aqueous suspension of the waste products of said trimming operation and calcium hydroxide and agitating said suspension to convert the basic carbonate to magnesium hydroxide, subjecting the resulting suspension to carbonation with carbon dioxide at substantially normal temperature and under a pressure in the range 7–25 lbs. gauge to convert the magnesium hydroxide to magnesium bicarbonate, and adding the magnesium bicarbonate thus formed to the original bicarbonate solution for reconversion to basic magnesium carbonate.

3. The method of treating basic magnesium carbonate waste material produced during the manufacture of magnesia heat insulation products which comprises, causticizing said material by adding it to a dilute aqueous suspension of calcined hydrated dolomite, extending said causticizing operation with agitation over a period sufficient to effect conversion of the magnesia values to the form of magnesium hydroxide, carbonating the resulting suspension with carbon dioxide at substantially normal temperatures and under comparatively low pressure below 45 lbs. per square inch gauge to convert the magnesia values to soluble magnesium bicarbonate, and separating the resulting magnesium bicarbonate solution from insoluble calcium carbonate simultaneously formed.

4. The method of treating trimming wastes resulting from the manufacture of basic magnesium carbonate heat insulation products which comprises, reducing said trimmings to a fineness of 20–60 mesh and separating asbestos fibres associated therewith, adding the resulting basic carbonate fines to a dilute aqueous suspension of calcined hydrated dolomite and causticizing a minor proportion by weight of the basic carbonate with an excess of the calcined hydrated dolomite to convert the magnesia values to magnesium hydroxide, carbonating the resulting suspension with carbon dioxide at substantially normal temperature and under a relatively low pressure in the range 7–25 lbs. gauge, and separating the aqueous solution of magnesium bicarbonate thus formed from insoluble calcium carbonate

HERMANN F. VIEWEG.
ARTHUR B. CUMMINS.
THOMAS C. POND.

Certificate of Correction

Patent No. 2,338,886. January 11, 1944.

HERMANN F. VIEWEG ET AL.

It is hereby certified that errors appear in the printed specification of the above numbered patent requiring correction as follows: Page 3, first column, line 52, heading to Table III, for the word "Plastic" read Basic; line 53, for "Hydrate" read Hydrated; and second column, line 9, for "magnesium" read *magnesia*; and that the said Letters Patent should be read with these corrections therein that the same may conform to the record of the case in the Patent Office.

Signed and sealed this 25th day of April, A. D. 1944.

[SEAL]

LESLIE FRAZER,
*Acting Commissioner of Patents.*